Nov. 25, 1969  S. M. PRINDELL, JR., ET AL  3,479,815
ELAPSED TIME INDICATOR
Filed Sept. 27, 1967  2 Sheets-Sheet 1

INVENTORS
STUART M. PINDELL, JR.
MALCOLM R. PERRY
VINCENT W. MARTIN
DANIEL F. FRITSCH

BY Le Blanc & Shur

ATTORNEY

Nov. 25, 1969  S. M. PRINDELL, JR., ET AL  3,479,815
ELAPSED TIME INDICATOR
Filed Sept. 27, 1967  2 Sheets-Sheet 2

INVENTORS
STUART M. PINDELL, JR.
MALCOLM R. PERRY
VINCENT W. MARTIN
DANIEL F. FRITSCH

BY  Le Blanc & Shur

ATTORNEY

United States Patent Office 3,479,815
Patented Nov. 25, 1969

3,479,815
ELAPSED TIME INDICATOR
Stuart M. Prindell, Jr., Malcolm R. Perry, Vincent W. Martin, and Daniel F. Fritsch, Lancaster, Pa., assignors to Hamilton Watch Company, Lancaster, Pa., a corporation of Pennsylvania
Filed Sept. 27, 1967, Ser. No. 670,871
Int. Cl. G04b 5/20, 37/12, 47/00
U.S. Cl. 58—145                                     14 Claims

ABSTRACT OF THE DISCLOSURE

In one form, the elapsed time indicator comprises a housing releasably secured on the end of a rotating element for rotation therewith and a clock mechanism having a conventional escapement and balance wheel depending from a shaft mounted in the housing coaxially with the rotating element. A constant torque friction clutch is carried by the housing to translate the rotation of a monitored shaft into a constant torque input driving the clock mechanism which, in turn, drives a counter having a readout recording aggregate elapsed time of rotation of the rotating element. In another form, the clutch rotates within the housing driving the clock mechanism and counter which are fixed to the housing.

Background of the invention

This invention relates to an elapsed time indicator or hubhourmeter and particularly to an indicator for measuring the period of time during which a shaft rotates, thereby indicating the elapsed time of operation of a machine of which the shaft forms an integral part.

It is often desirable to measure the total elapsed running time of a continuously or intermittently operated machine, vehicle, or the like. A great many factors bearing on the proper operation and maintenance of a variety of machines depend on knowledge of the aggregate time of use of these machines. For example, lubrication schedules, periodic maintenance checks, wear-life of certain machines and parts thereof, equipment warranties and rentals, as well as other factors, depend to a large extent on the actual elapsed time of machine use, rather than on other factors, such as the age of the machine.

Automatic recordation of the cumulative time of use of machines is preferable as compared to the maintenance of a written log or record or other manual devices for recording the time of use which are subject to human frailties, including clerical error and inattention which result in unaccurate recordation. An example of a prior automatic elapsed time indicator for indicating the running time of a machine is set forth in U.S. Patent No. 1,703,491, wherein the vibratory movement of a machine swings a pendulum which operates a clock mechanism by winding a slip clutch, the winding action being only for a limited extent whereby the clock mechanism unwinds and stops shortly after the machine has stopped. In this mechanism, particular attention must be paid to the orientation of the indicator relative to the machine as the pendulum would not function if the indicator was affixed such that the pendulum remained to one side of its equilibrium point. More importantly, the motive power driving the clock mechanism in this type of indicator is derived from an oscillating pendulum and a momentary or extended interruption of the oscillation of such intermediate power source, as might occur if the monitored machine is moved, rotated, or otherwise reoriented, would appear as an error in the aggregate running time of the machine. Moreover, mechanisms of this type would not be sensitive to measure the time of use of substantially vibration-free machines or those vibrating in a direction paralleling the direction of the pendulum swing axis and particularly those machines wherein the indication of use resides in the rotation of a shaft.

Other conventional elapsed time indicators have provided variously operated sensors located between the monitored machine and a clock mechanism for sensing machine use and translating the sensed signal into an input to the clock mechanism. However, these suffer from the same defect as the above-described indicator in that a momentary or extended interruption of the intermediate sensor providing the power input to the clock mechanism introduces error in the indicated elapsed time. These intermediate sensors or power sources invariably depend for their operation on factors external to the monitored machine and not on the machine per se and accordingly are subject to error upon failure of these external factors and, in any event, introduce unnecessary friction losses.

Summary of the invention

The present invention provides an elapsed time indicator adapted to be releasably secured on the end of a rotary shaft for measuring the total time of use of a machine of which the shaft forms an integral part indicative of the running time of the machine. By a unique disposition of the parts hereof in combination with a novel arrangement of a constant torque friction clutch and clock movement, the rotary motion of a machine shaft is translated directly to and provides the motive power for the clock movement through the constant torque friction clutch. In this manner, the present clock movement is not subject to the interruptions and friction losses occasioned by the disposition of an intermediate motive source between the monitored machine and the clockwork input and the omission of such intermediate power source is particularly advantageous since the same may not accurately reflect the running time of the machine in the first instance as noted previously. The rotation of the monitored shaft according to the present invention is translated directly to the clock movement through the constant torque friction clutch which comprises a rotary clutch drum or disc connected to the monitored machine shaft for rotation in response to rotation of the monitored shaft. The drum or disc frictionally engages and rotatably drives a spring fixed at its inner end to an input shaft drivingly connected to a clock movement. The rotary clutch drum or disc is driven directly by the monitored shaft and imparts a frictional and constant drive force to the clock input gear through the spring.

The clock movement of the present invention comprises a conventional escapement and balance wheel, the torque output derived from the monitored shaft being provided directly to the escapement and providing the sole motive force therefor in lieu of a conventional mainspring. The clock movement output is, accordingly, directly responsive to the rotary motion of the monitored shaft and operable only under the influence of its applied torque through the constant torque clutch. Inaccuracies, which heretofore were introduced in indicators of this type due to the friction losses, variances, etc. of an intermediate motive force, are, by the present invention, entirely eliminated. With the foregoing unique combination of clock movement and constant torque clutch, a high degree of accuracy is realized and the clock movement will start within one second after the shaft of the monitored machine starts and stop within two seconds after the monitored shaft stops. Exceptional accuracy in determining aggregate elapsed time can thus be attained, particularly when employed in conjunction with machines which are used intermittently, the cumulative error being minimal and within acceptable limits.

Additionally, the elapsed time indicator or hubhourmeter of the present invention operates independently of the speed of rotation of the shaft of the monitored machine. It has been found that, with the foregoing arrangement, the clock movement is practically insensitive to variations in the rotary speeds of the monitored shaft from 200 to 10,000 r.p.m.

Moreover, the present indicator is provided in a compact housing adapted for mounting and receiving its sole support from the monitored rotating shaft. In one form hereof, the clock movement supports a time counter for visual display of elapsed time in hours and tenths and is journalled on and weighted to depend or float from a shaft fixed to and rotatable with the indicator housing, the latter being secured on the end of the monitored shaft for rotation therewith. The clutch drum or disc is fixed to the housing and the constant torque is applied to the clock input gear through a clutch sleeve and gear rotatably mounted on the shaft. In this manner, the indicator housing rotates with the monitored shaft while the spacially fixed clock movement and counter float from the housing shaft, the clock movement driving the counter to provide a readout in elapsed operating time of the machine.

In another form hereof, the clock movement supports a digital readout time counter and is fixed to the indicator housing. The fourth shaft of the clock movement supports a spring which frictionally engages the clutch drum or disc, the latter being mounted for rotation relative to the housing and adapted for connection directly to the monitored shaft or a flexible cable driven from the rotary shaft. In this form, the indicator housing does not rotate with the monitored shaft and may be permanently mounted on the machine.

Various types of springs may be employed. A spiral spring having an inner end in driving relation to the clock movement and its outer end in frictional engagement along the arcuate inner sides of the clutch drum provides the most consistently constant torque output over wide variations of input r.p.m. Another type provides a helical spring located diametrically across the clutch drum with the ends thereof in frictional engagement against the inner sides of the clutch drum. The helical spring is confined within a housing having a central stem extending normally to the spring axis and drivingly connected to the clock movement. Still another type of spring comprises radially extending arms flexed axially so that the tips thereof frictionally bear against a clutch disc driven by the monitored shaft. The latter two types of springs are normally employed in situations wherein the monitored shaft provides a substantially constant torque input although the accuracy of these types if employed with variable speed monitored shafts is not substantially less than the accuracy of the spiral spring type.

Accordingly, it is a primary object of the present invention to provide an elapsed time indicator for indicating the running time of a machine, vehicle or the like having a rotating shaft.

It is another object of the present invention to provide an elapsed time indicator for indicating aggregate running time of use of an intermittently operated machine, vehicle, or the like having a rotating shaft.

It is still another object of the present invention to provide an elapsed time indicator having a clock movement deriving its sole motive force from the monitored rotating shaft.

It is a further object of the present invention to provide an elapsed time indicator having the foregoing characteristics and which is independent of rotary speed and the size of the rotating element of the monitored machine, vehicle, or the like.

It is still a further object of the present invention to provide an elapsed time indicator having the foregoing characteristics and which is highly sensitive and substantially immediately responsive to the initiation and stopping of rotation of the monitored shaft of the machine, vehicle, or the like, whereby exceptional accuracy is realized.

It is still a further object of the present invention to provide an elapsed time indicator having the foregoing characteristics wherein the indicator is provided in an integral compact housing easily and readily secured to and supported by the rotating shaft of the machine, vehicle, or the like.

These and further advantages and objects of the invention will become more apparent upon reference to the following specification, claims, and appended drawings.

Description of the drawing figures

Description of preferred embodiment

Figure 1:
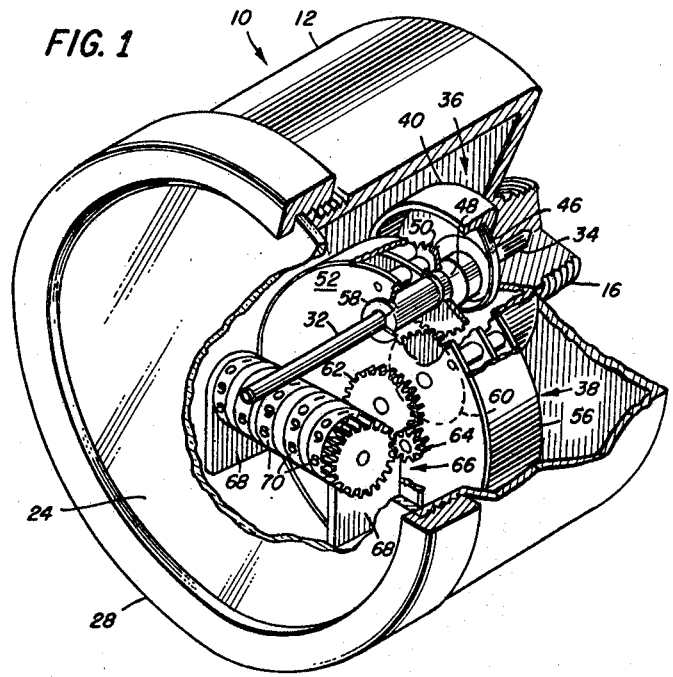
FIGURE 1 is a perspective view of one form of the elapsed time indicator of the present invention shown with parts broken away and in section for ease of illustration.
Figure 2:
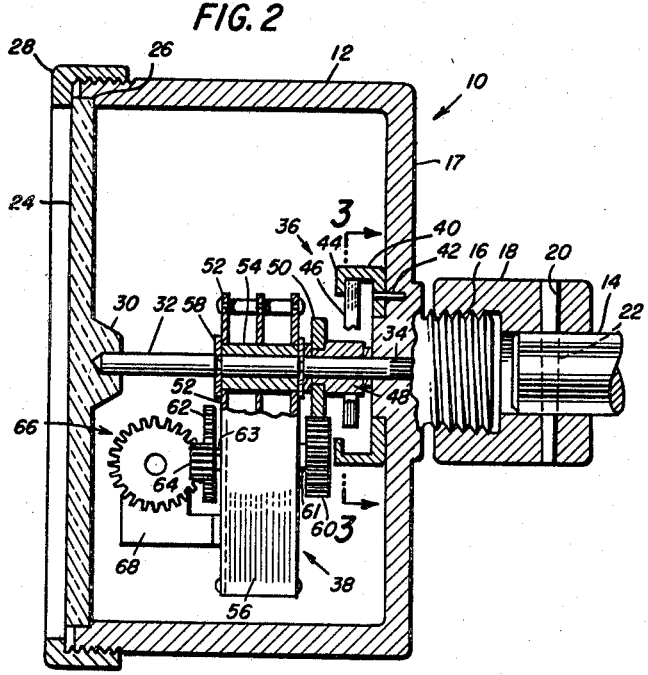
FIGURE 2 is a longitudinal sectional view thereof showing the elapsed time indicator coupled to a rotating element.
Figure 3:
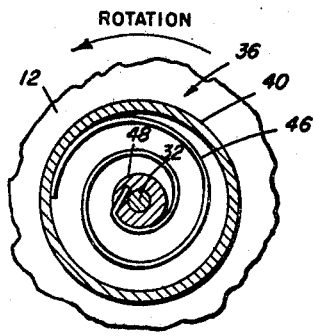
FIGURE 3 is a fragmentary, transverse, sectional view thereof taken on line 3—3 of FIGURE 2.

Referring to the form illustrated in FIGURES 1–3 of the drawings, a hubhourmeter or elapsed time indicator is generally indicated at 10, and has a cylindrical, cup-shaped housing 12 adapted for coaxial and releasable mounting on a rotary element or shaft 14 (FIGURE 2) such as the axle of a wheeled vehicle or the shaft of a monitored machine. In the illustrated form, housing 12 has an externally threaded boss 16 projecting integrally from base 17 and adapted to threadedly engage an internally threaded coupling member 18 having a diametrical bore 20. A pin (not shown) is adapted to pass through bore 20 and a registering diametrical bore 22 in rotating element 14 whereby coupling member 18 secures housing 12 to rotating element 14 for rotation therewith. It will be appreciated that the illustrated coupling arrangement is exemplary only, that numerous other coupling arrangements could be provided including flexible rotary transmission cables such as Bowden cables, and that coupling members of different sizes can be provided whereby indicator 10 may be fixed for rotation with rotating shafts of various diameters and is independent of any particular diameter.

Cup-shaped housing 12 is closed at its open end by a crystal or window 24 of transparent material secured against an annular shoulder 26 formed on housing 12 by a bezel 28. Window 24 has a rearwardly facing apertured boss 30 supporting an end of a shaft 32 which is fixed at its opposite end in the base of housing 12 as by a splined connection indicated at 34 whereby shaft 32 rotates with and has an axis of rotation coincident with the axis of rotation of rotating element 14.

As best seen in FIGURES 2 and 3, a constant torque friction clutch, generally indicated at 36, translates the rotary motion of housing 12 and hence rotating element 14 into a constant torque input to a clock mechanism generally indicated at 38 and described hereinafter. Clutch 36 comprises a cylindrical, cup-shaped barrel or drum 40 suitably fixed to the base of housing 12 as by a pin 42 for coaxial rotation with housing 12. An inwardly extending flange 44 retains a spiral spring 46 within barrel 40. The inner end of spiral spring 46 is secured to a sleeve or spool 48 mounted for free rotation relative to shaft 32, spool 48 having a gear 50 fixed thereto. The outer end of spring 46 frictionally bears against the inner cylindrical face of drum 40 providing the sole connection therewith. With spool 48 free to rotate on shaft 32, it can be seen that when drum 40 rotates in the direction of the arrow noted in FIGURE 3, a frictional drag force is imparted to the spring tending to wind the spring about spool 48 whereby a torque is applied to spool 48. The torque transmitted from rotary drum 40 to spool 48 is a function of the coefficient of friction between the outer end of the spring and the inner face of clutch drum 40 and it is therefore readily seen that the torque exerted on spool 48 is constant and independent of the speed of rotation of the clutch drum 40.

Clock movement 38 is supported by three bridge plates 52 which have eccentrically located registering openings receiving a bearing sleeve 54 mounted on and for free rotation relative to shaft 32. The lower portion of clock mechanism 38 is weighted as at 56 whereby the clock movement is suspended from shaft 32 in fixed spacial relation thereto for all rotary positions of shaft 32. A pair of washers 58 are suitably keyed to shaft 32 to prevent relative axial displacement of clock movement 38 along shaft 32.

A gear 60 projects from clock mechanism 38 on a clock mechanism input shaft 61 to engage gear 50, gear 60 being driven at a constant torque by shaft 14 through constant torque clutch 36. Gear 60, in turn, drives the gear train of the clock movement whose speed is accurately controlled by a balance wheel and escape mechanism (not shown) of the type commonly used in watches. As is well known, torque applied to an escape wheel of such mechanism provides the motive force for oscillating a balance wheel, the rate of oscillation thereof being substantially constant over a wide range of torque values. The escape wheel is coupled through suitable gearing (not shown) to a clock movement output gear 62 carried on a clock mechanism output shaft 63, the gear 62 being indicative of the time during which torque has been applied to gear 60 by rotating element 14. Accordingly, the constant torque imparted to gear 60 applies a torque to an escape wheel of an escapement mechanism, causing the lever of the escapement to oscillate and impart its oscillatory force to a balance wheel. The rate of oscillation of the balance wheel is virtually independent of the applied torque so that the balance wheel limits the oscillation of the escapement wheel which is suitably geared to output gear 62. It should be noted that the torque applied to the balance wheel and escapement by the mainspring in conventional clock mechanisms is, in the present invention, replaced by the constant torque applied through constant torque clutch 36 and that the conventional mainspring is thus eliminated in the present clock mechanism. It is believed that since the foregoing is the only difference from conventional clock mechanisms and since escapement and balance wheel mechanisms are well known in the art, further description or detailed illustration of clock mechanism 38 is unnecessary.

Output gear 62 of clock work 38 is suitably geared as at 64 to a counter mechanism 66 having a digital readout 70 calibrated in hours and tenths of aggregate time. Counter 66 may be of any well known construction and may be of the type illustrated in the previously noted U.S. Patent No. 1,703,491. Counter 66 is supported by a pair of brackets 68 fixed to the outermost plate 52 of clock mechanism 38 whereby counter 68, as well as clock mechanism 38, depend and float from shaft 32.

In use, housing 12 is fixed by means of coupling 18 to the end of a shaft 14 forming a part of a machine or vehicle whose running aggregate time is to be recorded. When the machine is operating, shaft 14 drives housing 12 and clutch drum 40 such that the latter imparts a frictional drag to the outer end of spiral spring 46 tending to wind the spring which, in turn, imparts a constant torque to sleeve 48. Gear 50 on spool 48 drives gear 60 which operates the escapement and balance wheel mechanism of clock movement 38. Note that clock mechanism 38 and counter 66 have sufficient combined weight as to be spacially fixed as housing 12 and shaft 32 rotate and are thus maintained in position to provide a reaction force to clock mechanism 38. A weight 56 may be provided if desired to insure this depending floating action. Clock output gear 62 drives the counter 66 which provides a dial readout in hours and tenths of the cumulative time during which element 14 has been rotating and hence the running time of the machine. The bearing 54 from which clock mechanism 38 and counter 66 depend, as well as bearing spool 48, are frictionless bearings whereby impulses imparted to the clock mechanism and counter tending to rotate the same about shaft 32 when the rotary movement of element 14 starts and stops are minimized and produce no significant error in total aggregate time recorded.

Figure 4:
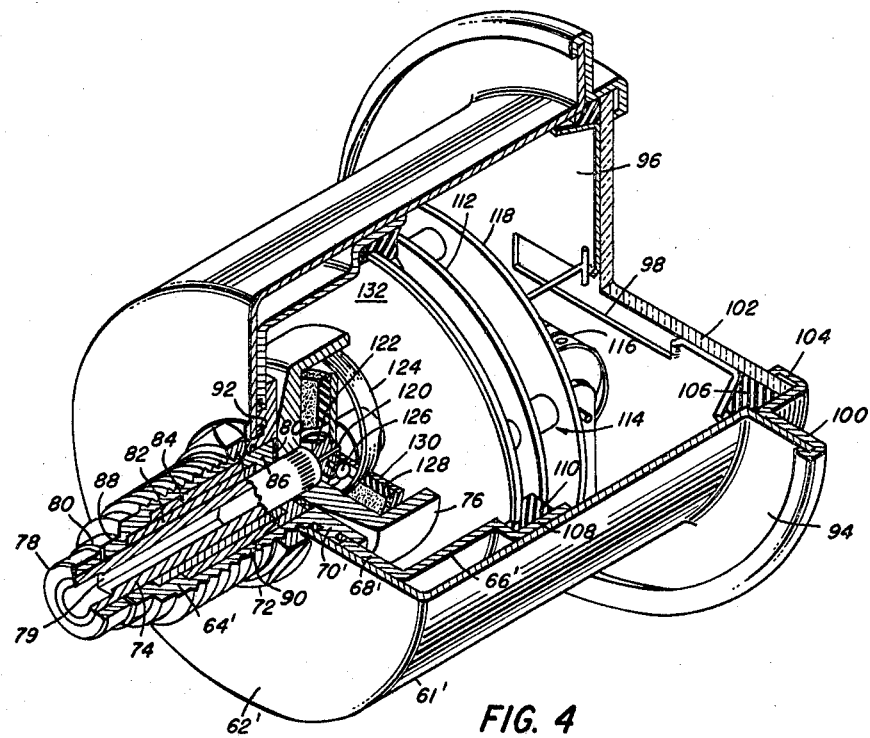
FIGURE 4 is a perspective view of another form of the elapsed time indicator shown with parts broken away and in section for ease of illustration.
Figure 5:
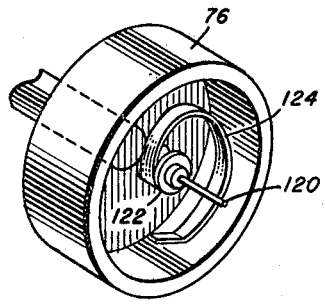
FIGURE 5 is a fragmentary perspective view illustrating a spiral spring as employed in the clutch drum.

Referring to the form illustrated in FIGURE 4, the elapsed time indicator comprises a cylindrical cup-shaped housing 61' having a reduced opening through its base 62' receiving an axially bored externally threaded fitting 64'. A reduced diameter mounting cup 66' having a centrally apertured base 68' for receiving fitting 64' is clamped behind a collar 70' on fitting 64' against base 62' by a nut 72 externally threaded on fitting 64'. A drive shaft 74 extends axially through fitting 64' and mounts a clutch drum 76 on its inner end for rotation therewith and within mounting cup 66'. A collar 78 is press fitted about the outer end of drive shaft 74 and cooperates with drum 76 to restrain shaft 74 against axial displacement. A pair of thrust washers 80 are located at opposite ends of fixed fittings 64' and provide bearing surfaces for the base of clutch drum 76 and collar 78 respectively.

The bore of drive shaft 74 has a square cross section indicated at 79 for receiving a mating end portion of a flexible drive cable, not shown, such as for example, a Bowden cable, whereby drive shaft 74 may be connected to and driven in rotation by the rotary shaft of the monitored machine or vehicle. Drive shaft 74 rotates in fitting 64' within a sintered bronze oil impregnated sleeve 82 encompassed by a wick-filled reservoir 84 providing additional lubricant therefor, bearing sleeve 82 and reservoir 84 being constrained against axial displacement by the clamping action of clutch drum 76 against a collar 86 which, in turn, clamps sleeve 82 and reservoir 84 against stepped shoulders 88. Suitable washer seals 90 are provided to prevent loss of lubricant from the bearing 82. A suitable O-ring seal 92 is also provided between collar 70' and base 62'.

A radial extending annular flange 94 is formed on the opposite open end of housing 61' and a backing plate 96 having a central slot 98 is suitably secured within the open end of housing 61'. A bezel 100 clamps about flange 94 and clamps a crystal 102 against the outer face of backup plate 96. Suitable crystal and bezel gaskets are provided at 104 and 106, respectively.

The outer end of mounting cup 66' has an enlarged stepped flange 108 bearing against housing 61' and providing a seat for a gasket 110 which provides a shock resistant mounting for the third bridge plate 112 of a clock movement generally indicated at 114. A digital counter 116 is mounted on the outer face of first bridge plate 118 of clock movement 114 in registry with slot 98. Clock movement 114 and counter 116 are identical to the clock movement and counter illustrated in the previous embodiment with the exception that clock movement 114 and counter 116 in this form are rigidly fixed to housing 61'.

The fourth shaft 120 of clock movement 114 extends within clutch drum 76 a distance short of drive shaft 74 and mounts a spool 122. The inner end of a spiral torque spring 124 is fixed to a sleeve or spool 122 by a pin 126 and the outer end thereof frictionally bears against the inner cylindrical surface of clutch drum 76. Torque spring 124 extends within and is substantially enveloped along its opposite flat sides over a majority of its length by a foam rubber pad or bed 128, spring 124 and pad 128 being prevented from axial displacement from within clutch drum 76 by backup plate 130 mounted on the inner end of spool 122. Foam rubber pad 128 engages torque spring 124 with sufficient force to dampen resonant vibration and insufficient force to disturb the equilibrium position of the spring 124 or the spring force on the clutch drum 76. A debris seal 132 comprising a thin plastic membrane covers the back of the third plate and protects the clock movement 114 from contamination from debris generated by the frictional clutch action.

In use, drive shaft 74 is suitably connected to the rotary shaft of the monitored machine as by a Bowden cable, not shown, or by any other suitable connection whereby the rotation of the monitored shaft is transmitted to drive shaft 74. Drive shaft 74 rotates clutch drum 76 and, as in the previous embodiment, the outer end of spring 124 is caused to frictionally drag along the inner surface of clutch drum 76, thereby imparting a constant torque to spool 122 and hence fourth shaft 120 of clock movement 114. Rotation of fourth shaft 120 provides a constant torque input to clock movement 114 which drives the escapement and balance wheel mechanism thereof as hereinbefore disclosed. A clock output gear, not shown, and similar to gear 62 in the previous embodiment, drives digital counter 116 to provide a visual display through slot 98 in hours and tenths of the aggregate elapsed running time of the machine.

It will be noted that in both embodiments, a substantially constant torque is provided the input of the clock movement over wide variations in input r.p.m. For example, the magnitude of the torque applied to the clock movement is very nearly independent of the input r.p.m., varying approximately ±5% throughout a range of 200–10,000 r.p.m. input. Moreover, the timing accuracy is exceptionally accurate and better than ±1% (typically ±0.1%) for input speeds of 5 r.p.m. to over 10,000 r.p.m. The indicator additionally begins to record time within 1 second after starting and stops approximately 2 seconds after the input r.p.m. is stopped.

Figure 6:
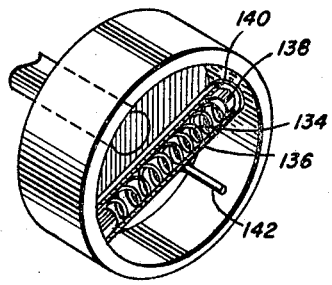
FIGURE 6 is a fragmentary perspective view of a helical spring as employed in the clutch drum.
Figure 7:
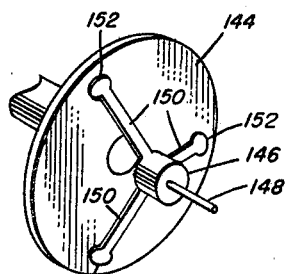
FIGURE 7 is a fragmentary perspective view of a radial spring as employed with the clutch disc.

While the spiral spring illustrated in both embodiments is preferred and provides substantially constant torque output over wide variations in input r.p.m., other spring forms such as illustrated in FIGURES 6 and 7 may be used. In FIGURE 6, a helical spring is enclosed within a tubular member 137 and located within a clutch drum, corresponding to the clutch drum in either embodiment, such that the axis of spring 134 is coincident with the diameter of the clutch drum. A pair of cylindrical plugs 138 engage within opposite ends of spring 134 and have enlarged tip portions frictionally engaging against the inner surface of the clutch drum. A stem 142 located in axial alignment with the axis of rotation of the clutch drum is suitably fixed to cylindrical member 136 to project outwardly of the clutch drum and may correspond to a fourth shaft or be connected directly or through suitable gearing, not shown, to drive the fourth shaft of the clock movement. In this manner, rotation of the clutch drum imparts frictional drag force to the outwardly spring biased plugs 138 to induce rotation of spring 134 about the axis of the clutch drum and hence rotating stem 142, and actuating the clock movement.

In the type of constant torque spring clutch illustrated in FIGURE 7, a clutch disc 144 is rotatably driven by the rotary shaft of the monitored machine through either of the driving connections therewith in the two previous embodiments. A spring having a base 145 spaced from disc 144 is suitably fixed to a spool 146 carried on a stem 148 which, like stem 142, may correspond to a fourth shaft or be connected directly or through suitable bearing, not shown, to drive fourth shaft 120 of the clock movement. The spring has a plurality of radially extending arms 150 which flex forwardly such that the enlarged outer ends 152 frictionally engage against the planar surface of clutch disc 144. Rotation of clutch disc 144 imparts a frictional drag force to the radial spring, causing the same to rotate at a substantially constant torque whereby the clock movement is driven through shaft 148.

It should be noted that in employing the spiral type of spring, constant torque is applied to spools 48 and 122 only when the associated clutch drum rotates in a direction to constrict the spiral spring, i.e., a counterclockwise direction looking inwardly from the crystal in FIGURE 4 and a clockwise direction in FIGURE 1. To dispose the indicator on or drive the same from the end of an oppositely rotating shaft, either the spring must be placed such that the convolutions thereof run in the opposite direction or the indicator be disposed on or driven from the opposite end of the monitored rotary shaft. Also, idler pinions, not shown, are inserted in the clock movement gear train to maintain proper gear train direction of rotation in the event that the clutch drum or disc drives the springs in the opposite direction.

It is a significant feature that the sole motive power for the clock mechanism is derived directly from the rotating element of the monitored machine. Power sources for the clockwork intermediate the clockwork and the monitored machine are not required and the inaccuracies introduced thereby in indicators of this type are eliminated. The coaxial mounting of the constant torque clutch 36 and the rotating shaft 14 provides a simple, direct reaction drive to clock mechanisms without reliance on an intermediate power source. This unique disposition of these parts also provides for a rugged compact indicator construction, virtually free from breakdown, thereby imparting a long wear life to the indicator. The wear rates of the torque spring and drive cup are sufficiently low to provide over 10,000 hours of continuous maintennace free operation at 6,000 r.p.m.

It is thus seen that the objects of the invention are fully accomplished in that there is provided a simple, integral and compactly constructed elapsed time indicator for indicating aggregate running time of a machine having a rotating element. By the unique foregoing arrangement, the clock mechanism is immediately responsive to the initiation and stopping of the rotary element such that the accuracy relaized by the indicator is within one second of the running time of the machine. Moreover, the readout is independent of the speed of rotation of the rotary element and the sole energy source for driving the indicator resides in the rotating element of the monitored machine.

What is claimed and desired to be secured by United States Letters Patent is:

1. Apparatus for measuring elapsed time of movement of a rotating element comprising a substantially constant torque clutch having rotary input and output members, means adapted to connect said input member to a rotating element for rotating said input member in response to rotation of the element, the rotation of said input member being continuous during rotation of the element, a clockwork movement having input and output shafts, said output member being drivingly connected to said input shaft, the output shaft of said clockwork movement being actuated only in response to substantially simultaneous movement of said input shaft, elapsed time indicating means connected to the output shaft of said clockwork whereby the elapsed time of rotary movement of said element is measured, said input and output members respectively comprising a clutch drum having a rim and a spiral spring contained within said drum, the inner end of said spring being drivingly connected to said input shaft and the outer end of said spring being in sliding frictional engagement against said rim, and means substantially enveloping said spring to dampen resonant vibration thereof.

2. Apparatus for measuring elapsed time of movement of a rotating element comprising a substantially constant torque clutch having rotary input and output members, means adapted to connect said input member to a rotating element for rotating said input member in response to rotation of the element, the rotation of said input member being continuous during rotation of the element, a clockwork movement having input and output shafts, said output member being drivingly connected to said input shaft, the output shaft of said clockwork movement being actuated only in response to substantially simultaneous movement of said input shaft, elapsed time indicating means connected to the output shaft of said clockwork whereby the elapsed time of rotary movement of said element is measured, said input and output members respectively comprising a clutch drum having a rim and a spiral spring contained within said drum, the inner end of said spring being drivingly connected to said input shaft and the outer end of said spring being in sliding frictional engagement against said rim, and a shaft having an axis coincident with the axis of said clutch drum and extending therein, said clock movement and indicating means depending from said shaft for rotation relative to said clutch drum.

3. Apparatus according to claim 2 wherein said first mentioned connecting means comprises a housing for said clock movement and indicating means adapted for rotation with the rotating element, said clutch drum being fixed within and to said housing for rotation about an axis coincident with the axis of rotation of the rotating element, said last mentioned shaft having opposite ends carried by said housing, the longitudinal axis of said shaft being coincident with the axis of rotation of said clutch drum.

4. Apparatus according to claim 3 wherein said shaft is fixed to said housing for rotation therewith, said clockwork movement being radially offset from and rotatably mounted relative to said shaft, said indicating means being carried by said clockwork movement.

5. Apparatus according to claim 4 including a sleeve mounted on said shaft for rotation relative thereto, a gear fixed to said sleeve, a mating gear fixed to said clockwork movement input shaft, said clockwork movement input shaft being radially spaced from said shaft.

6. Apparatus according to claim 4 wherein said housing comprises a cup-shaped member and a transparent face, means securing said face to the open end of said cup-shaped member, said shaft being supported between the base of said cup-shaped member and said transparent face, said indicating means including a digital counter carried by said clockwork movement and visible through said face.

7. In combination with a rotating element, apparatus for measuring elapsed time of movement of said rotating element comprising a substantially constant torque clutch having rotary input and output members, means adapted to connect said input member to said rotating element for rotating said input member in response to rotation of said element, the rotation of said input member being continuous during rotation of said element, a clockwork movement having input and output shafts, said output member being drivingly connected to said input shaft, the output shaft of said clock work movement being actuated only in response to substantially simultaneous movement of said input shaft, elapsed time indicating means connected to the output shaft of said clockwork whereby the elapsed time of rotary movement of said element is measured, said input and output members respectively comprising a clutch drum having a rim and a spiral spring contained within said drum, the inner end of said spring being drivingly connected to said input shaft and the outer end of said spring being in sliding frictional engagement against said rim, said first mentioned connecting means comprising a cup-shaped housing, means coupling the base of said housing to said rotating element for coaxial rotation of said housing and said rotating element, said housing including a transparent face and means securing said face to the open end of said housing, a shaft fixed at opposite ends to said face and the base of said housing and having a longitudinal axis coincident with the axis of rotation of said rotating element, said clutch drum being secured to the inner face of the base of said housing for coaxial rotation with said rotating element, a sleeve rotatably mounted on said shaft, said clockwork movement being radially offset from and rotatably mounted on said shaft to depend therefrom, weight means fixed to said clockwork movement to spacially fix the latter relative to said shaft, said indicating means including a digital counter carried by said clockwork movement and visible through said face, first gear means drivingly connecting said clockwork movement input shaft and said sleeve, and second gear means drivingly connecting said counter and said clockwork movement output shaft.

8. Apparatus for measuring elapsed time of movement of a rotating element comprising a substantially constant torque clutch having rotary input and output members, means adapted to connect said input member to a rotating element for rotating said input member in response to rotation of the element, the rotation of said input member being continuous during rotation of the element, a clockwork movement having input and output shafts, said output member being drivingly connected to said input shaft, the output shaft of said clockwork movement being actuated only in response to substantially simultaneous movement of said input shaft, elapsed time indicating means connected to the output shaft of said clockwork whereby the elapsed time of rotary movement of said element is measured, said input and output members comprising a clutch disc and a spring, said spring including a spring base spaced axially from said disc and a plurality of radially extending arms flexed forwardly to engage the outer ends thereof against said disc, said base member being drivingly connected to said input shaft.

9. Apparatus for measuring elapsed time of movement of a rotating element comprising a substantially constant torque clutch having rotary input and output members, means adapted to connect said input member to a rotating element for rotating said input member in response to rotation of the element, the rotation of said input member being continuous during rotation of the element, a clockwork movement having input and output shafts, said output member being drivingly connected to said input shaft, the output shaft of said clockwork movement being actuated only in response to substantially simultaneous movement of said input shaft, elapsed time indicating means connected to the output shaft of said clockwork whereby the elapsed time of rotary movement of said element is measured, said input and output members respectively comprising a clutch drum having a rim and a helical spring extending substantially diametrically across said drum, said spring having opposite end portions in sliding frictional engagement against said rim, said output member including means drivingly connectng said spring with said input shaft.

10. Apparatus according to claim 9 wherein said end portions comprise cylindrical tips having flanges on their outer ends, said tips being located within the ends of said spring with the underside of said flanges bearing against the ends of said spring.

11. Apparatus for measuring elapsed time of movement of a rotating element comprising a substantially constant torque clutch having rotary input and output members, means adapted to connect said input member to a rotating element for rotating said input member in response to rotation of the element, the rotation of said input member being continuous during rotation of the element, a clockwork movement having input and output shafts, said output member being drivingly connected to said input shaft, the output shaft of said clockwork movement being actuated only in response to substantially simultaneous movement of said input shaft, elapsed time indicating means connected to the output shaft of said clockwork whereby the elapsed time of rotary movement of said element is measured, a cup-shaped housing, said first mentioned connecting means including a shaft rotatably mounted through the base of said housing and mounting said clutch input member on the inner end thereof, means mounting said clockwork and said indicating means within said housing, and a transparent face carried by said housing adjacent its open, said indicating means being in registry with said transparent face and providing visual display of elapsed time through said face, said input and output members comprising a clutch disc and a spring, said spring including a spring base spaced axially from said disc and a plurality of radially extending arms flexed forwardly to engage the outer ends thereof against said disc, said base member being drivingly connected to said input shaft.

12. Apparatus for measuring elapsed time of movement of a rotating element comprising a substantially constant torque clutch having rotary input and output members, means adapted to connect said input member to a rotating element for rotating said input member in response to rotation of the element, the rotation of said input member being continuous during rotation of the element, a clockwork movement having input and output shafts, said output member being drivingly connected to said input shaft, the output shaft of said clockwork movement being actuated only in response to substantially simultaneous movement of said input shaft, elapsed time indicating means connected to the output shaft of said clockwork whereby the elapsed time of rotary movement of said element is measured, a cup-shaped housing, said first mentioned connecting means including a shaft rotatably mounted through the base of said housing and mounting said clutch input member on the inner end thereof, means mounting said clockwork and said indicating means within said housing, and a transparent face carried by said housing adjacent its open end, said indicating means bieng in registry with said transparent face and providing visual display of elapsed time through said face, said input and output members respectively comprising a clutch drum having a rim and a helical spring extending substantially diametrically across said drum, said spring having opposite end portions in sliding frictional engagement against said rim with the axis of the helical spring lying substantially coincident with a diameter of said drum, said output member including means drivingly connecting said spring with said input shaft.

13. Apparatus for measuring elapsed time of movement of a rotating element comprising a substantially constant torque clutch having rotary input and output members, means adapted to connect said input member to a rotating element for rotating said input member in response to rotation of the element, the rotation of said input member being continuous during rotation of the element, a clockwork movement having input and output shafts, said output member being drivingly connected to said input shaft, the otuput shaft of said clockwork movement being actuated only in response to substantially simultaneous movement of said input shaft, elapsed time indicating means connected to the output shaft of said clockwork whereby the elapsed time of rotary movement of said element is measured, a cup-shaped housing, said first mentioned connecting means including a shaft rotatably mounted through the base of said housing and mounting said clutch input member on the inner end thereof, means mounting said clockwork and said indicating means wtihin said housing, and a transparent face carried by said housing adjacent its open end, said indicating means being is registry with said transparent face and providing visual display of elapsed time through said face, said clockwork movement mounting means including a mounting cup, said clockwork movement being mounted adjacent the open end of said mounting cup, means securing said mounting cup coaxially within said cup-shaped housing with the inner end of said shaft extending within said mounting cup, said input and output members respectively comprising a clutch surface and a spring, an end portion of said spring being in sliding frictional engagement against said clutch surface, means sealing said clockwork movement from said clutch, and means substantially enveloping said spring to dampen resonant vibration thereof.

14. Apparatus for measuring elapsed time of movement of a rotating element comprising a substantially constant torque clutch having rotary input and output members, means adapted to connect said input member to a rotating element for rotating said input member in response to rotation of the element, the rotation of said input member being continuous during rotation of the element, a clockwork movement having input and output shafts, said output member being drivingly connected to said input shaft, the output shaft of said clockwork movement being actuated only in response to substantially simultaneous movement of said input shaft, elapsed time indicating means connected to the output shaft of said clockwork whereby the elapsed time of rotary movement of said element is measured, and support means mounting said clockwork movement and said indicating means for substantially free pivotal movement about a substantially horizontal axis, said clockwork and said indicating means having a center of gravity offset from said horizontal axis.

References Cited

UNITED STATES PATENTS 3,385,049   5/1968   Perkins _____ 58—145

STEPHEN J. TOMSKY, Primary Examiner

E. C. SIMMONS, Assistant Examiner

U.S. Cl. X.R.

58—152

PO-1050
(5/69)

UNITED STATES PATENT OFFICE
CERTIFICATE OF CORRECTION

Patent No. 3,479,815          Dated November 25, 1969

Inventor(s) STUART M. PINDELL, JR. ET AL

It is certified that error appears in the above-identified patent and that said Letters Patent are hereby corrected as shown below:

Column 8, line 43, "relaized" should read -- realized --. Column 11, line 7, after "open" insert -- end --; line 37, "bieng" should read -- being --. Column 12, line 1, "otuput" should read -- output --; line 11, "wtihin" should read -- within --; line 13, "is" should read -- in --.

SIGNED AND
SEALED
JUN 30 1970

(SEAL)
Attest:

Edward M. Fletcher, Jr.
Attesting Officer

WILLIAM E. SCHUYLER, JR.
Commissioner of Patents